United States Patent
Baracca et al.

(10) Patent No.: US 11,401,969 B2
(45) Date of Patent: Aug. 2, 2022

(54) HOUSING ELEMENT WITH AXIALLY MOVABLE BEARING UNIT

(71) Applicant: Aktiebolaget SKF, Gothenburg (SE)

(72) Inventors: Fausto Baracca, Massa (IT); Andrea A. Bertolini, Carrara (IT); Fabio Falaschi, Carrara (IT); Pasquale Frezza, Aversa (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/154,226

(22) Filed: Jan. 21, 2021

(65) Prior Publication Data

US 2021/0222735 A1    Jul. 22, 2021

(30) Foreign Application Priority Data

Jan. 22, 2020 (IT) .................... 102020000001081

(51) Int. Cl.
     *F16C 23/08*      (2006.01)
     *F16C 35/077*      (2006.01)
     *F16C 33/66*      (2006.01)

(52) U.S. Cl.
     CPC ........ *F16C 23/084* (2013.01); *F16C 33/6622* (2013.01); *F16C 35/077* (2013.01)

(58) Field of Classification Search
     CPC ........ F16C 23/06; F16C 23/08; F16C 23/082; F16C 23/084; F16C 33/6622; F16C 33/6659; F16C 35/077
     See application file for complete search history.

(56) References Cited

U.S. PATENT DOCUMENTS 2,397,164 A  *   3/1946   Shafer .................. F16C 35/047
                                                           384/495
3,807,819 A      4/1974   Zimmer et al.
5,536,090 A      7/1996   Nisley

FOREIGN PATENT DOCUMENTS

| DE | 29615500 | 10/1996 |
|----|----------|---------|
| DE | 102018104940 | 9/2019 |
| EP | 1832154 | 9/2007 |
| JP | S52166051 | 12/1977 |
| JP | 2016-114157 | * 6/2016 |

OTHER PUBLICATIONS

International Search Report for corresponding Italy Patent Application No. 102020000001081 dated Oct. 22, 2020.

* cited by examiner

*Primary Examiner* — James Pilkington
(74) *Attorney, Agent, or Firm* — Reed Smith LLP

(57) ABSTRACT

A housing element having a casing provided with a cylindrical seat, a bearing unit located inside the cylindrical seat of the casing, a metal ring arranged between the casing and the bearing unit and provided with a spherical seat. The metal ring is assembled inside the cylindrical seat of the casing and is axially movable along the cylindrical seat. The bearing unit is coupled with the metal ring by its spherical seat and is axially movable together with the metal ring. The metal ring is provided with a first groove, which is radially external, and a first radial hole in fluid communication with the first groove so as to allow a supply of grease to the bearing unit.

16 Claims, 3 Drawing Sheets

Fig. 1-Prior art

HOUSING ELEMENT WITH AXIALLY MOVABLE BEARING UNIT

CROSS REFERENCE OF RELATED APPLICATION

This application is based on and claims priority to Italian Application No. 102020000001081, filed Jan. 22, 2020, under 35 U.S.C. § 119, the entire contents of which are incorporated herein by reference.

FIELD

The present disclosure relates to a housing element with an axially movable bearing unit for applications in the manufacturing industry.

In particular, the present disclosure relates to a housing element with an axially movable bearing unit and is suitable for those applications where the shaft on which the bearing unit is mounted requires axial displacements or in those applications where the housing element and the bearing unit are subject to differential thermal expansion and which therefore require a degree of axial freedom of movement of the bearing unit.

BACKGROUND

As is known, the bearing units operate in a correct manner if their components—rings with raceways and associated rolling members—are correctly lubricated with lubricating grease and if this grease is replenished during the working life of the bearing unit such that the units never operate dry or with insufficient lubricating grease.

Housing elements may comprise an external housing casing for a bearing unit and a supply of lubricating grease to such a bearing unit is made possible by a conduit formed through a casing and connecting a grease reservoir with the bearing unit. This arrangement, however, may not be effective in situations where the bearing unit is axially movable since the displacement of such a bearing unit could not allow sufficient access of the grease inside it.

FIG. 1 shows a housing element 1 comprising a casing 4 and a bearing unit 3 which is mounted inside the casing 4 in an axially movable manner and is provided with a radially inner ring 3a which is internally engaged by a rotating shaft 2 and a radially outer ring 3b which has a spherical radially outer surface 3c with a convex appearance. The housing element 1 further comprises an inner cylindrical seat 4a axially delimited by a side wall 4b of the casing 4, and a metal ring 5, which is mounted radially inside the inner cylindrical seat 4a so as to slide axially relative to the inner cylindrical seat 4a and is radially arranged between the casing 4 and the radially outer ring 3b so as to allow the bearing unit 3 an axial displacement into a first operating position against the elastic ring 6 inserted inside the inner cylindrical seat 4a, on the opposite side of metal ring 5 to the side wall 4b, and a second operating position against the wall 4b.

In the embodiments shown in FIG. 1, a housing element 1 further comprises a radial duct 7 formed through the housing 4 at the inner cylindrical seat 4a so as to allow the injection of a lubricating grease (known and not shown) inside the inner cylindrical seat 4a and therefore allow the lubrication of the bearing unit 3.

In some cases, bearing units of "standard" type are provided with axial sealing screens 8 arranged between the inner and outer rings and axially on both sides with respect to the rolling elements in order to prevent the entry of contaminants inside the units, but in such a solution described above it is possible to use only one sealing screen 8 in order to allow the lubrication of the bearing unit 3 by means of the injection of lubricating grease through the duct 7 and it is necessary to use an external seal 9 radially arranged between a side wall 4b of the housing 4 and the rotating shaft 2 or the radially inner ring 3a not only in order to protect the bearing unit 3 from the external contaminants, but also to prevent lubricating grease escaping from the casing 4 itself. Therefore, the solution described above not only does not allow such a type of bearing units to be used, but also this solution requires use of a further external seal 9, thereby increasing the production costs. Moreover, since a bearing unit 3 is axially movable inside the inner cylindrical seat 4a, the injection of the lubricating grease inside the seat 4a may be performed only when the bearing unit 3 is not located in an axial position such as to obstruct the outlet of the duct 7.

The above comments illustrate certain drawbacks, for which there is no known solution, that reduce the usefulness of housing elements 1 of the aforementioned type and both make the production thereof particularly costly and make maintenance thereof relatively complex.

Therefore, there exists the need for a housing element with an axially movable bearing unit, which does not have the aforementioned drawbacks, namely not only allows, if necessary, the use of bearing units of the aforementioned type with two axial sealing screens, but also allows re-lubrication and maintenance operations to be performed in a simple and linear manner without the use of precautionary measures of various kinds.

On the basis of the exemplary embodiments, a housing element with axially movable bearing unit is provided which does not have the drawbacks described above in reference to FIG. 1.

BRIEF DESCRIPTION OF THE DRAWINGS

Embodiments in accordance with this disclosure will now be described with reference to the attached drawings which illustrate non-limiting examples of embodiments of the sealing system for food applications, in which.

DETAILED DESCRIPTION

According to exemplary embodiments, a housing element with an axially movable bearing unit is provided.

Figure 1:
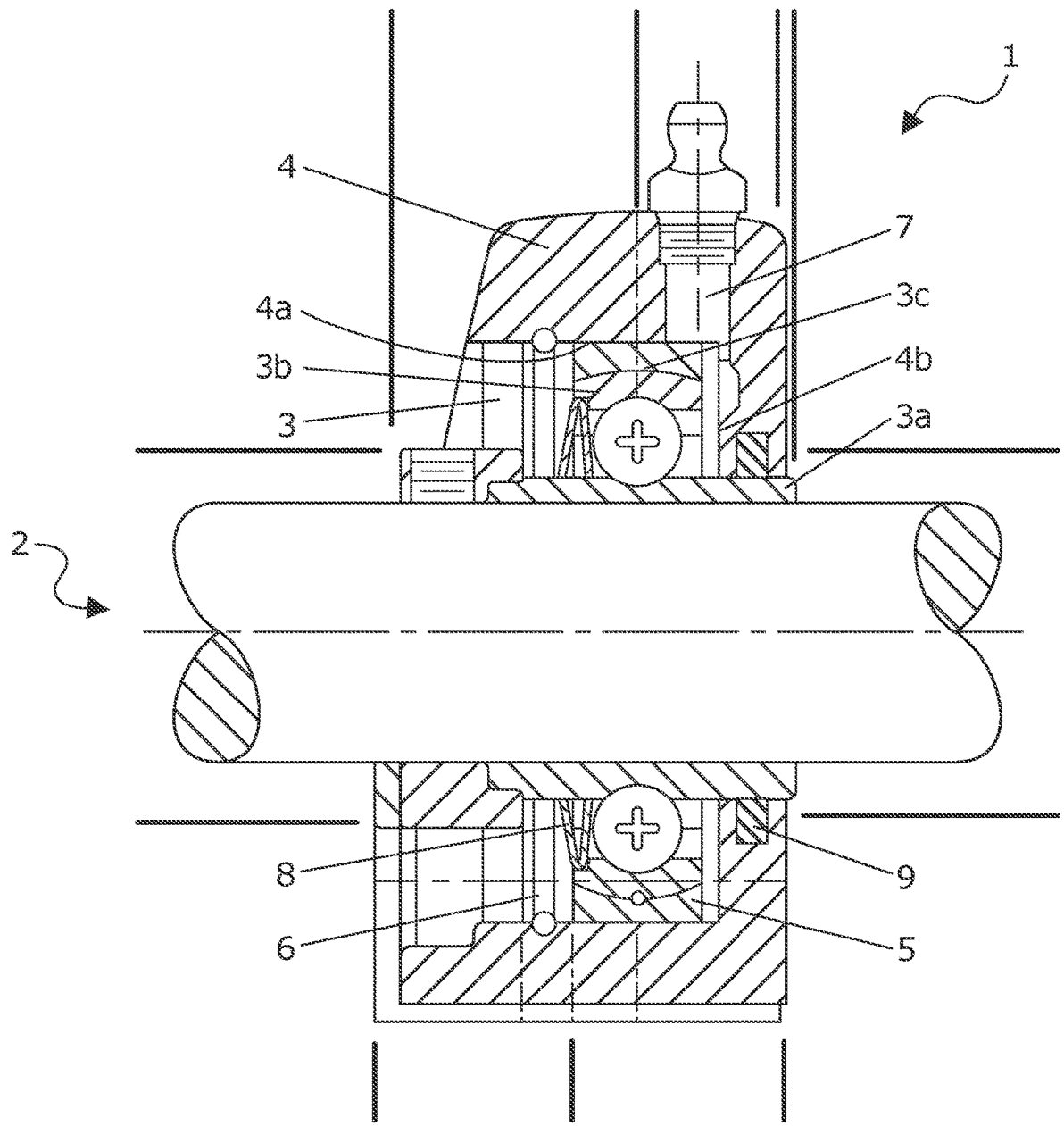
FIG. 1 shows a cross-sectional view of a housing element with axially movable bearing unit according to prior art.
Figure 2:
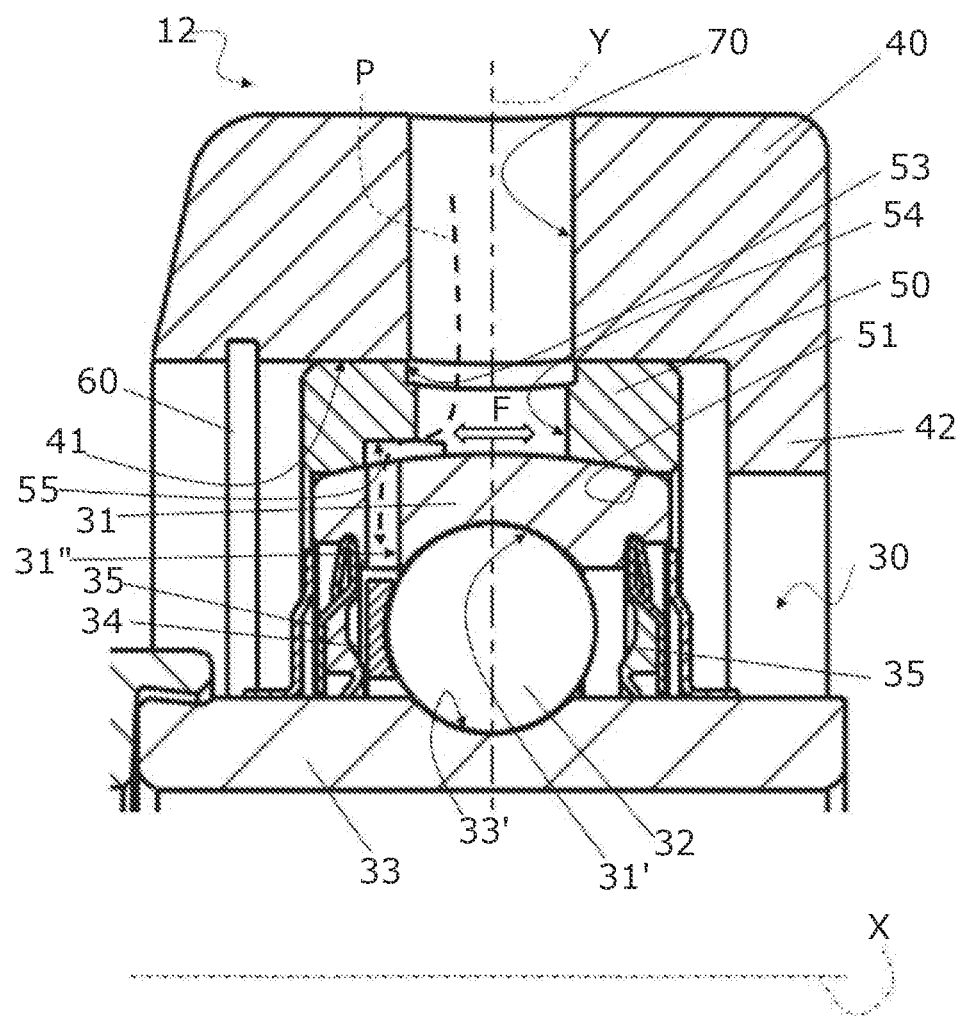
FIG. 2 shows a cross-sectional view of a preferred embodiment of a housing element with axially movable bearing unit according to various embodiments in accordance with the present disclosure.
Figure 3:
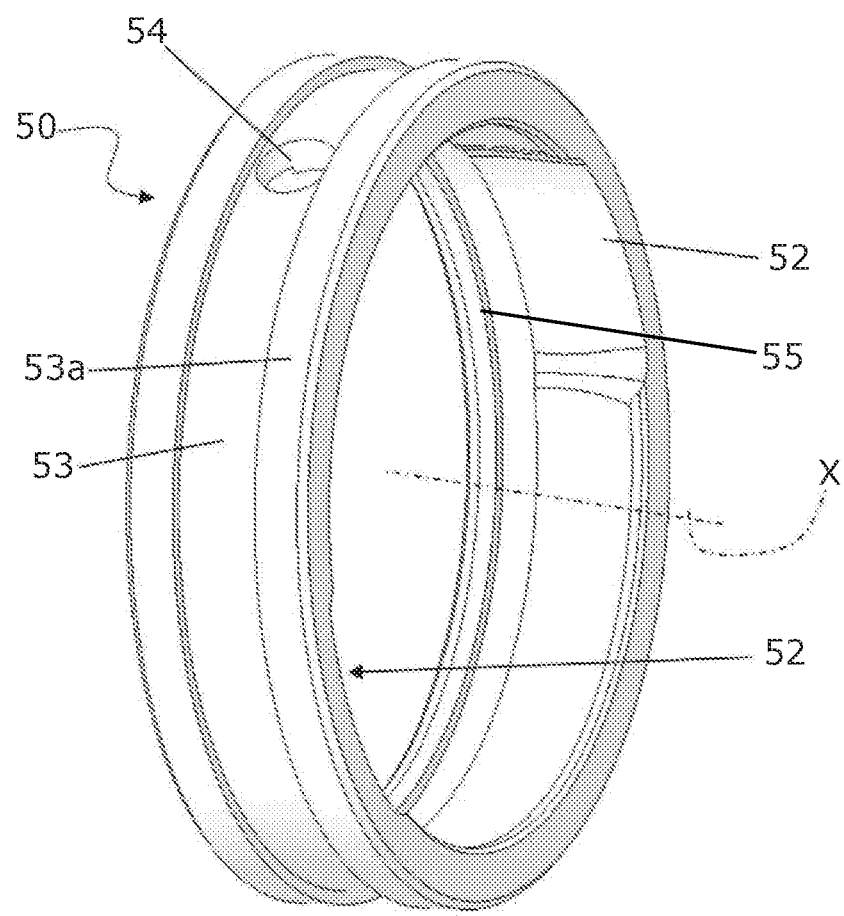
FIG. 3 is a perspective view of a detail of the housing element according to FIG. 2.

With reference now to FIGS. 2 and 3, below an embodiment of a housing element with axially movable bearing unit according to the exemplary embodiments is described purely by way of example.

With reference to FIG. 2, the housing element 10 for applications in the manufacturing industry—for example in textile, mining, or motor vehicle industries or also for applications in agricultural machines or in industrial plants—comprises a casing 40 with axial symmetry relative to an axis X and a bearing unit 30 housed inside it. This housing element 10 may be used in the aforementioned industrial applications for fixing against a machine frame and forms part of the exemplary embodiments.

Exemplary embodiments of a bearing unit, e.g., 30, in turn may comprise:
- a radially outer ring 31, which is preferably—but not necessarily—stationary;
- a radially internal ring 33, which is rotatable about a central axis of rotation X of the bearing unit 30;
- a row of rolling elements 32, in this example balls, arranged between the radially outer ring 31 and the radially inner ring 33;
- a cage 34 for containing the rolling bodies so as to keep the rolling elements of the rows of rolling bodies 32 in position.

In the whole of the present description and in the claims, the terms and the expressions indicating positions and orientations such as "radial" and "axial" are understood as referring to the central axis of rotation X of the bearing unit 30.

A radially outer ring 31 is provided with a radially outer raceway 31', while A radially inner ring 22 is provided with a radially inner raceway 33' for allowing rolling of A row of rolling elements 32 arranged between the radially outer ring 31 and A radially inner ring 33. For the sake of simpler graphical illustration reference number 32 will be attributed both to the individual balls and to the row of balls. Again for the sake of simplicity, the term "ball" may be used by way of example in the present description and in the attached drawings instead of the more generic term "rolling element" (and likewise the same reference numbers will be used), which may alternatively cylindrical or of tapered type.

Bearing unit 30 may also be provided with sealing means 35 for sealing off the bearing unit from the external environment. Below, sealing means 35 may be indicated also more simply as seals, understood as referring to the same component.

Casing 40 is provided with a cylindrical seat 41 in which a metal ring 50 may move axially and bearing unit 30 is housed inside metal ring 50, inside a spherical seat 51 of the metal ring.

Axial displacement of the metal ring 50 and, together with it, of bearing unit 30 may take place in both directions, parallel to the axis x as indicated by the double arrow F and is limited, on the axial side, by a resilient ring 60 and, on the opposite axial side, by a radial wall 42 of casing 40, which preferably will have a length in the radial direction not greater than 6 mm.

Moreover, housing element 10 is provided with a radial duct 70 formed through the casing 40 in the region of internal cylindrical seat 41 and therefore of metal ring 50 for supplying the lubricating grease for replenishing the necessary amount of grease inside a bearing unit 30. Duct 70 is provided with a diameter greater than the axial displacement envisaged for metal ring 50 and bearing unit 30.

With this solution it is possible to use a standard bearing unit, namely with both the seals 35 on each side of the rolling elements, because the grease supply function is always allowed owing to the fact that the metal ring 50 is provided with a first circumferential groove 53 with an axial width such as to intercept, in any position of the bearing unit 30 relative to the casing 40, the outlet of lubricating grease supply duct 70 and connect this groove 53 to the inside of the bearing unit 30.

With reference to FIG. 3, the metal ring 50 is provided with two radially inner recesses 52 which are diametrically opposite relative to the axis of symmetry X and which are needed for insertion of the bearing unit 30. Moreover, the metal ring 50 is provided with a first—radially external—groove 53 formed in a radially outer surface 53a of the metal ring 50. As already mentioned, this first groove 53 has an axial width such as to intercept, in any position of the bearing 30 unit with respect to the casing 40, the outlet of the duct 70. Moreover, the first groove 53 communicates with a first radial hole 54. In this way the lubricating grease may pass through the first groove 53 and reach the first radial hole 54. This radial hole 54 is a through-hole which crosses the metal ring 50. By means of the radial hole 54, the lubricating grease reaches the bearing unit 30.

More precisely, and with reference to FIG. 2, the supplying of grease is performed by following the path P. The lubrication grease is supplied by means of the duct 70 of the casing 40 and then passes inside the first groove 53 of the metal ring 50 and reaches the first radial hole 54. After passing through the radial hole 54 the grease reaches a second—radially internal—groove 55 located in the spherical seat 51 of the metal ring 50 and finally reaches the inside of the bearing unit 30 by means of a second radial hole 31" situated inside the radially outer ring 31 of the bearing unit.

Preferably, the metal ring 50 may allow an axial displacement of not less than 5 mm, or not less than 2.5 mm for each sense of displacement in the axial direction with respect to an axis Y perpendicular to the axis X of symmetry and passing through a centre plane of the bearing unit 30.

The tolerance of the spherical seat 51 between the metal ring 50 and the bearing unit is not subject to variations compared to other known embodiments. The coupling between the metal ring 50 and the cylindrical seat 41 of the casing 40 is performed by means of a slight interference, using respectively a tolerance class K7 (+10, −25) for the cylindrical seat 41 of the casing 40 and a tolerance class h7 (0, −35) for the radially outer surface 53a of the metal ring 50. This slight interference allows the metal ring 50 to be assembled and disassembled without having to exert an excessive force, but at the same time it prevents the rotation of the metal ring 50 inside the cylindrical seat 41.

It is important in any case to have an interference in this coupling because it prevents seepage of grease between the casing and metal ring (which otherwise would occur if the coupling had play) and the corrosion resulting from contact between ring and cylindrical seat of the housing is prevented.

The material of the casing 40 may be cast iron, steel or stainless steel, while the material of the metal ring 50 is preferably aluminium. This enables a significant weight reduction to be achieved. Where weight is not a problem, the metal ring 50 may also be made of steel.

The main advantages of this type of solution are clear from the description provided and, in any case, may be summarised as follows:
- the use of a standard bearing unit;
- guarantee of optimum protection against contaminating agents since the bearing unit is provided with sealing means on both sides;
- the casing does not require further sealing means;
- supplying of the grease is allowed in all possible positions of the metal ring and consequently of the bearing unit;
- an axial displacement of at least 5 mm is ensured.

In addition to the embodiments of the invention, as described above, it is to be understood that numerous further variants are possible. It must also be understood that said embodiments are only examples and do not limit the subject of the invention, nor its applications, nor its possible configurations. On the contrary, although the description provided above enables the person skilled in the art to implement the exemplary embodiments at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A housing element comprising:
   a casing provided with a cylindrical seat;
   a bearing unit provided with sealing means and disposed inside the cylindrical seat of the casing;
   a metal ring, interposed between the casing and the bearing unit, and provided with a spherical seat;
   wherein the metal ring is disposed in the cylindrical seat of the casing and axially movable along said cylindrical seat;
   wherein the bearing unit is coupled to the metal ring by the spherical seat and is axially movable together with the metal ring; and
   wherein the metal ring is provided with a first groove on a radially external surface of the metal ring and a first radial hole in fluid communication with said first groove to allow grease supply to the bearing unit;
   wherein axial movement of the metal ring and the bearing unit is limited by an elastic ring of the housing element and a radial wall of the casing.

2. The housing element according to claim 1, wherein a fluid path (P) for supplying grease to the bearing unit is defined, in sequence, by a conduit of the casing, the first groove of the metal ring, the first radial hole of the metal ring, a second groove on a radially internal side of the metal ring and in communication with the spherical seat and a second radial hole located in an outer ring of the bearing unit.

3. The housing element according to claim 2, wherein a length in the radial direction of the radial wall of the casing is not greater than 6 mm.

4. The housing element according to claim 3, wherein the coupling between the radially external surface of the metal ring and the cylindrical seat of the casing is made using a tolerance class K7 for the cylindrical seat of the casing and a tolerance class h7 for the radially external surface of the metal ring.

5. The housing element according to claim 2, wherein the coupling between the radially external surface of the metal ring and the cylindrical seat of the casing is made using a tolerance class K7 for the cylindrical seat of the casing and a tolerance class h7 for the radially external surface of the metal ring.

6. The housing element according to claim 1, wherein the axial movement of the metal ring and the bearing unit is not less than 5 mm.

7. The housing element according to claim 6, wherein the axial movement of the metal ring and of the bearing unit is not less than 2.5 mm for each direction of translation in the axial direction, relative to a center line axis (Y) of the bearing unit.

8. The housing element according to claim 7, wherein the coupling between the radially external surface of the metal ring and the cylindrical seat of the casing is made using a tolerance class K7 for the cylindrical seat of the casing and a tolerance class h7 for the radially external surface of the metal ring.

9. The housing element according to claim 6, wherein a length in the radial direction of the radial wall of the casing is not greater than 6 mm.

10. The housing element according to claim 9, wherein the coupling between the radially external surface of the metal ring and the cylindrical seat of the casing is made using a tolerance class K7 for the cylindrical seat of the casing and a tolerance class h7 for the radially external surface of the metal ring.

11. The housing element according to claim 6, wherein the coupling between the radially external surface of the metal ring and the cylindrical seat of the casing is made using a tolerance class K7 for the cylindrical seat of the casing and a tolerance class h7 for the radially external surface of the metal ring.

12. The housing element according to claim 1, wherein a length in the radial direction of the radial wall of the casing is not greater than 6 mm.

13. The housing element according to claim 1, wherein the coupling between the radially external surface of the metal ring and the cylindrical seat of the casing is made using a tolerance class K7 for the cylindrical seat of the casing and a tolerance class h7 for the radially external surface of the metal ring.

14. A housing element comprising:
    a casing provided with a cylindrical seat;
    a bearing unit provided with sealing means and disposed inside the cylindrical seat of the casing;
    a metal ring, interposed between the casing and the bearing unit, and provided with a spherical seat;
    wherein the metal ring is disposed in the cylindrical seat of the casing and axially movable along said cylindrical seat;
    wherein the bearing unit is coupled to the metal ring by the spherical seat and is axially movable together with the metal ring; and
    wherein the metal ring is provided with a first groove on a radially external surface of the metal ring and a first radial hole in fluid communication with said first groove to allow grease supply to the bearing unit;
   wherein the coupling between the radially external surface of the metal ring and the cylindrical seat of the casing is made using a tolerance class K7 for the cylindrical seat of the casing and a tolerance class h7 for the radially external surface of the metal ring.

15. The housing element according to claim 14, wherein a fluid path (P) for supplying grease to the bearing unit is defined, in sequence, by a conduit of the casing, the first groove of the metal ring, the first radial hole of the metal ring, a second groove on a radially internal side of the metal ring and in communication with the spherical seat and a second radial hole located in an outer ring of the bearing unit.

16. The housing element according to claim 15, wherein the casing comprises a radial wall, wherein a length in the radial direction of the radial wall of the casing is not greater than 6 mm.

* * * * *